April 21, 1964   M. C. KLAPES ET AL   3,129,544
APPARATUS FOR CONVEYING AND FILLING CONTAINERS
Filed June 28, 1960   8 Sheets-Sheet 4
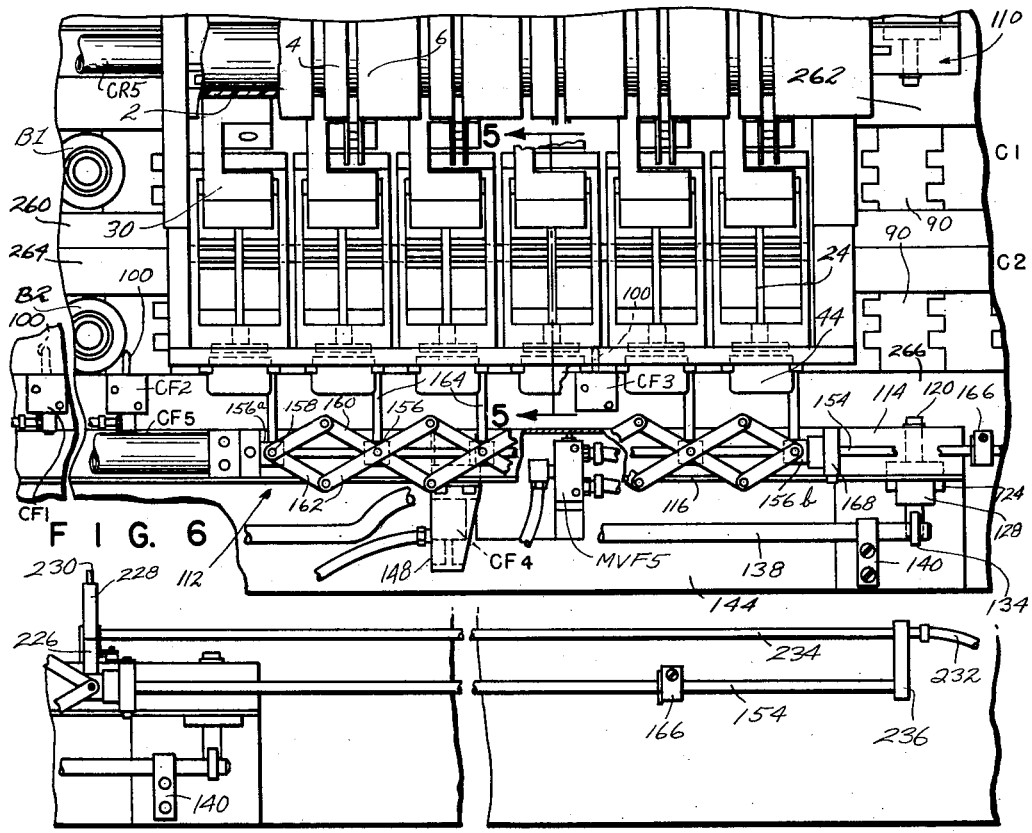
FIG. 6
FIG. 8
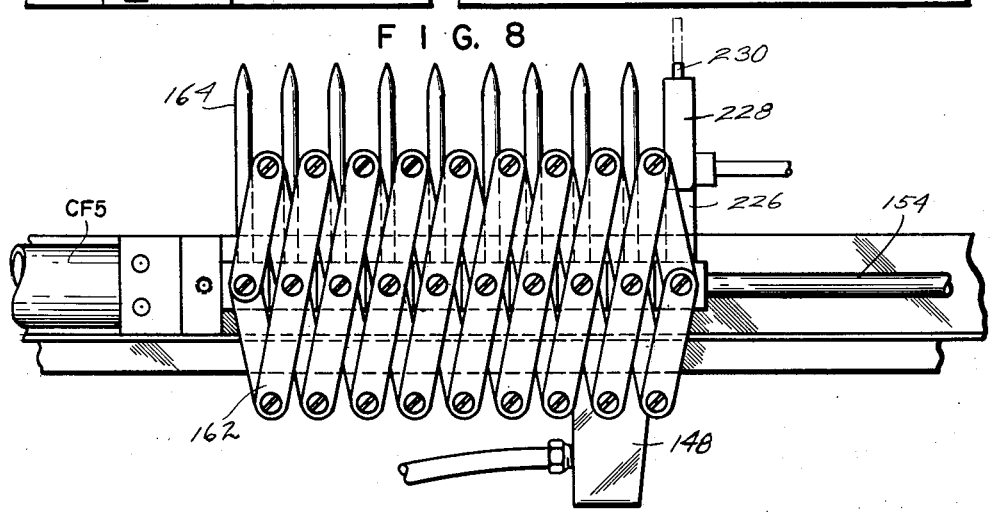
FIG. 7
INVENTORS
ERIC G. CLEVELAND
MICHAEL C. KLAPES
BY
Weingarten, Ortenbeck & Pandiscio
ATTORNEYS April 21, 1964     M. C. KLAPES ETAL     3,129,544
APPARATUS FOR CONVEYING AND FILLING CONTAINERS
Filed June 28, 1960     8 Sheets-Sheet 5

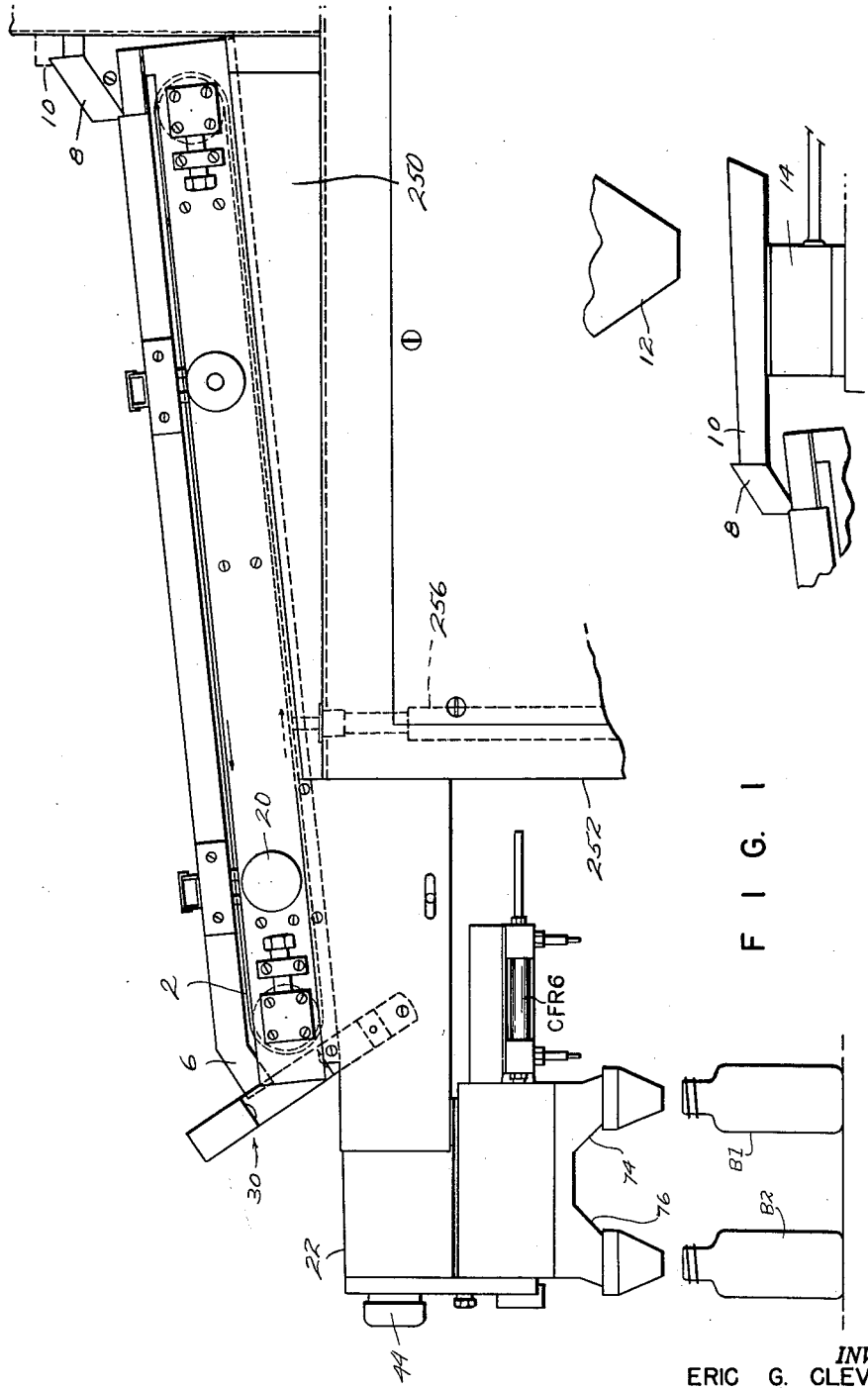

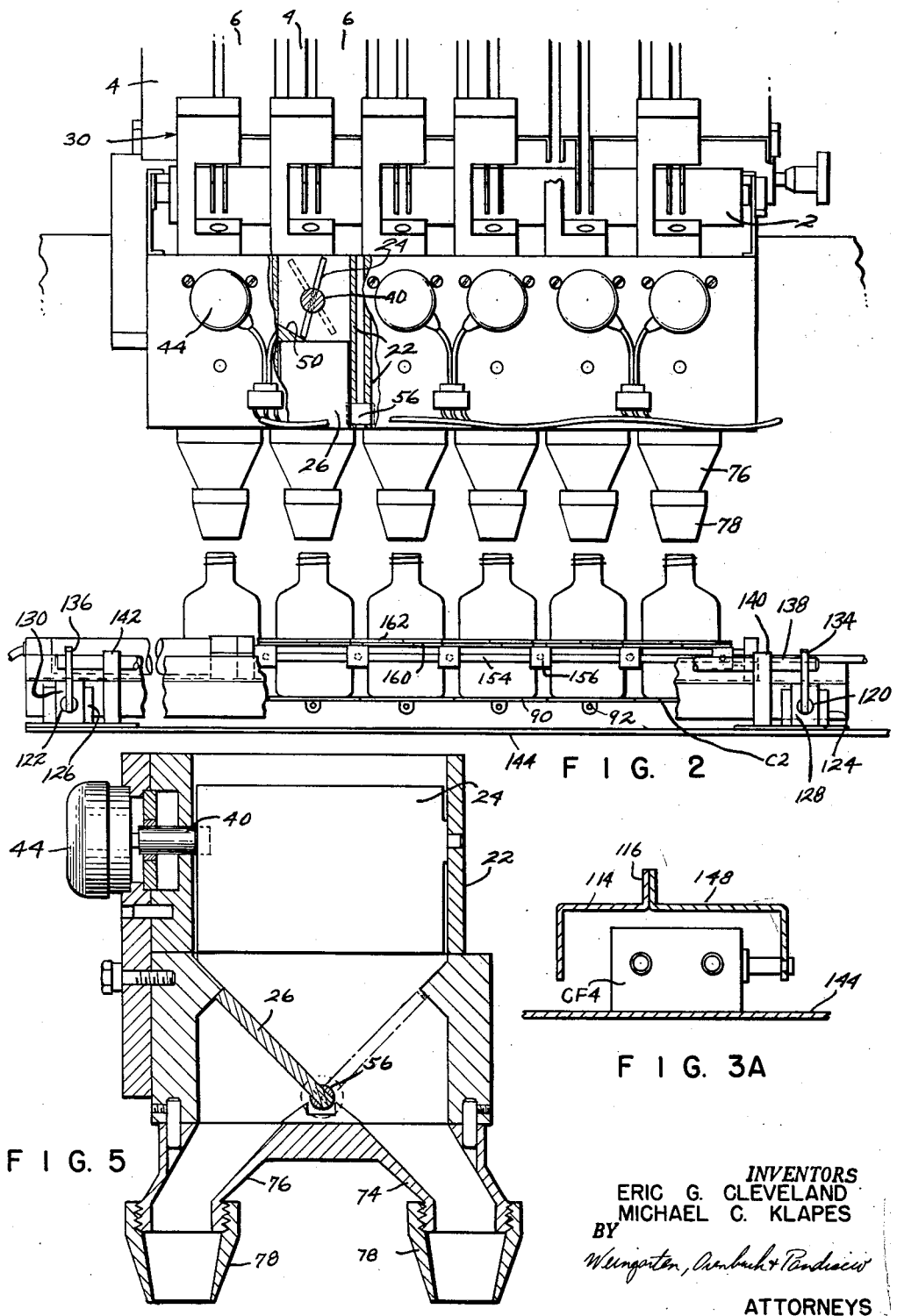

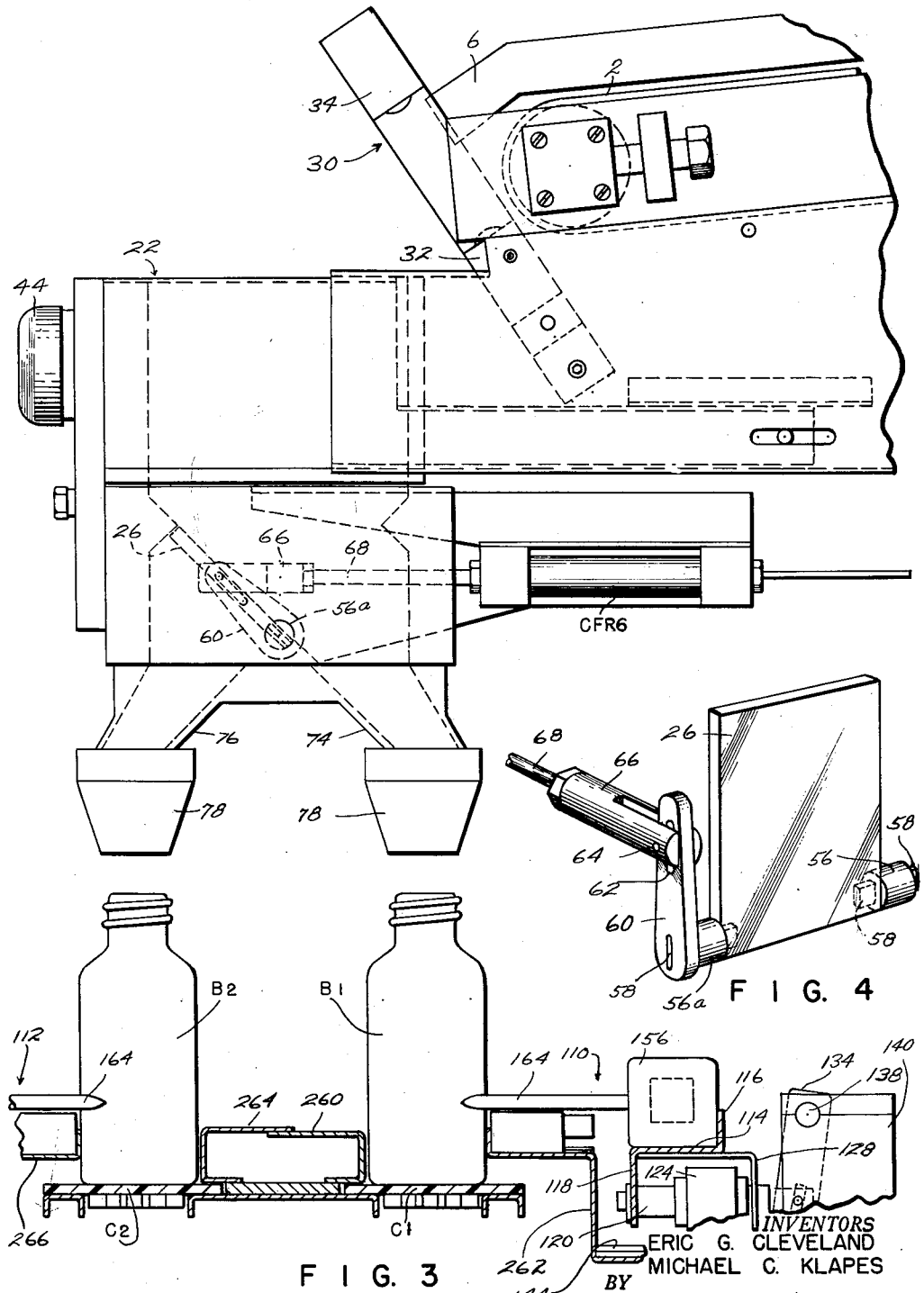

INVENTORS
ERIC G. CLEVELAND
MICHAEL C. KLAPES
BY
ATTORNEYS

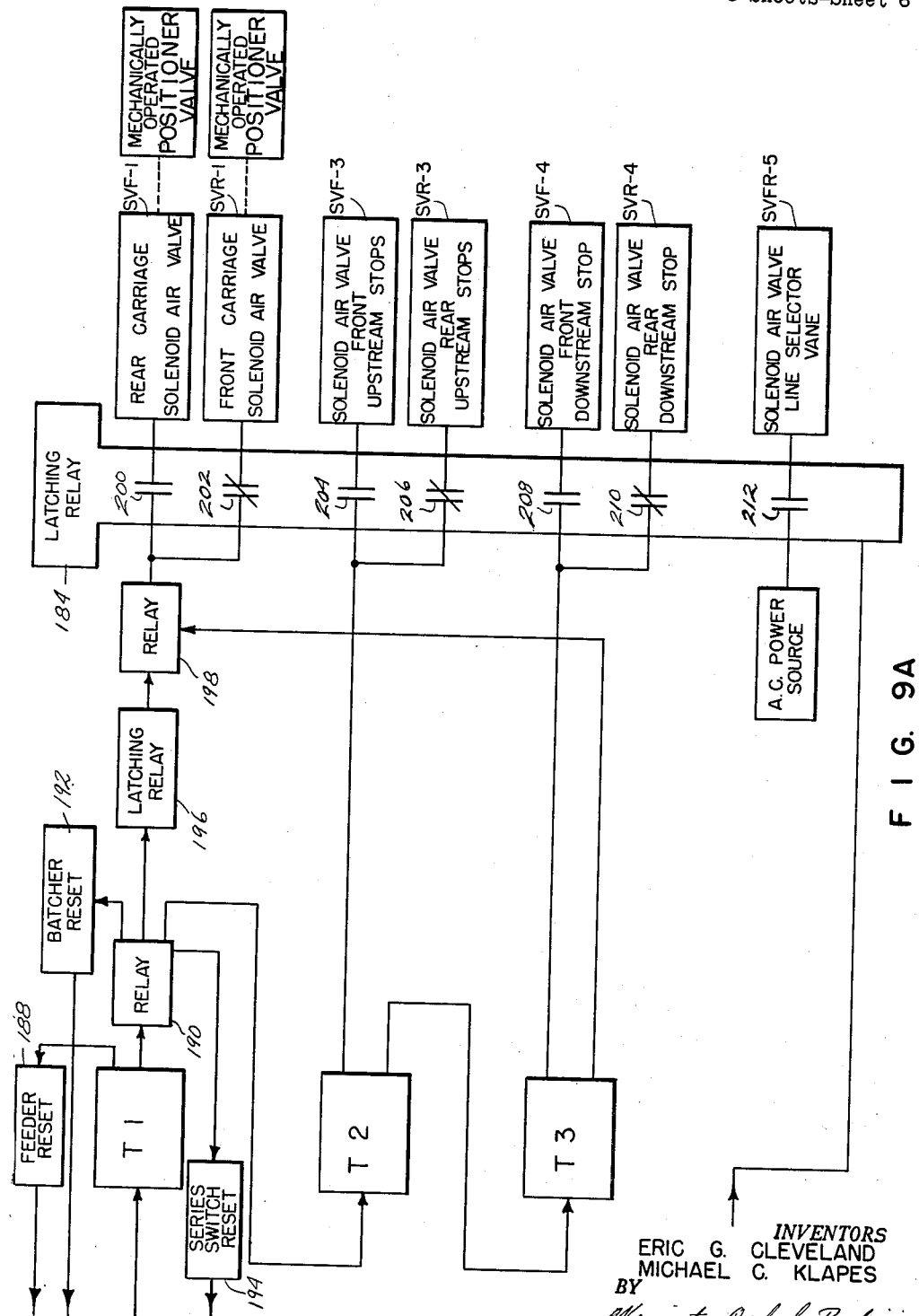

April 21, 1964 M. C. KLAPES ETAL 3,129,544
APPARATUS FOR CONVEYING AND FILLING CONTAINERS
Filed June 28, 1960 8 Sheets-Sheet 8

INVENTORS
ERIC G. CLEVELAND
MICHAEL C. KLAPES
BY

ATTORNEYS

United States Patent Office 3,129,544
Patented Apr. 21, 1964

3,129,544
APPARATUS FOR CONVEYING AND
FILLING CONTAINERS
Michael C. Klapes, Lynnfield, and Eric G. Cleveland,
Melrose, Mass., assignors to Delta Engineering Corporation, Melrose, Mass., a corporation of Massachusetts
Filed June 28, 1960, Ser. No. 39,297
16 Claims. (Cl. 53—64)

This invention relates to container conveying and filling apparatus and more particularly to apparatus adapted to simultaneously fill a predetermined number of containers with a predetermined number of articles, with means provided for automatically removing filled containers and for positioning a new group of containers for filling as before.

Heretofore many different types of machines have been constructed for the purpose of handling containers such as bottles and for rapidly filling these containers with a predetermined number of articles. Common types of articles which have had to be handled are tablets, capsules, and the like. These different kinds of machines, often called counting and filling machines, have generally suffered from certain important limitations. First of all, they have been limited to a predetermined article count. In other words, the machine generally has been designed to supply a given number of articles to a container, no more and no less. Another disadvantage has been that these machines generally have been unable to handle containers of different sizes. Still another limitation has been that the operation of the machine has had to be terminated while filled bottles were being removed and new bottles were being fed into place. Additional limitations, such as lack of accuracy, are well known to persons skilled in the art.

The primary object of the present invention is to provide a machine for rapidly filling a plurality of containers with a predetermined number of articles which is free of the limitations of machines previously available for the same purpose.

Still another important object of the present invention is to provide a new and improved conveyor system for transferring bottles or similar containers and for positioning them beneath a given number of filling stations, said system being adapted to handle bottles of different sizes.

A further specific object of the present invention is to provide a machine for filling containers with a predetermined number of articles, which machine includes a series of filling stations, and a conveyor system for positioning bottles at said stations, said conveyor system including means for segregating a sufficient number of bottles to occupy each of said filling stations, and means for spacing said bottles so that each bottle is positioned at a given filling station.

Other objects and many of the attendant advantages of the invention will be readily apparent from the following detailed specification when considered together with the accompanying drawings wherein:

FIG. 1 is a fragmentary side elevation of a bottle filling machine embodying the present invention;

FIG. 1A is a fragmentary side elevation showing certain additional features omitted from FIG. 1 because of space requirements;

FIG. 2 is a fragmentary front elevation of the machine of FIG. 1;

FIG. 3 is an enlarged fragmentary view similar to FIG. 1, but with the bottle conveyor assembly shown in cross-section;

FIG. 3A is a cross-sectional view showing how the bottle positioners are moved laterally;

FIG. 4 is a perspective view showing certain details of one end of the line selector vane assembly;

FIG. 5 is a sectional view taken along line 5—5 of FIG. 6;

FIG. 6 is a plan view of the apparatus illustrated in FIGS. 1, 2, and 3;

FIG. 7 is an enlarged plan view of a modified form of bottle spacing assembly;

FIG. 8 is a plan view showing additional features associated with the bottle spacing assembly of FIG. 7;

Figure 9:
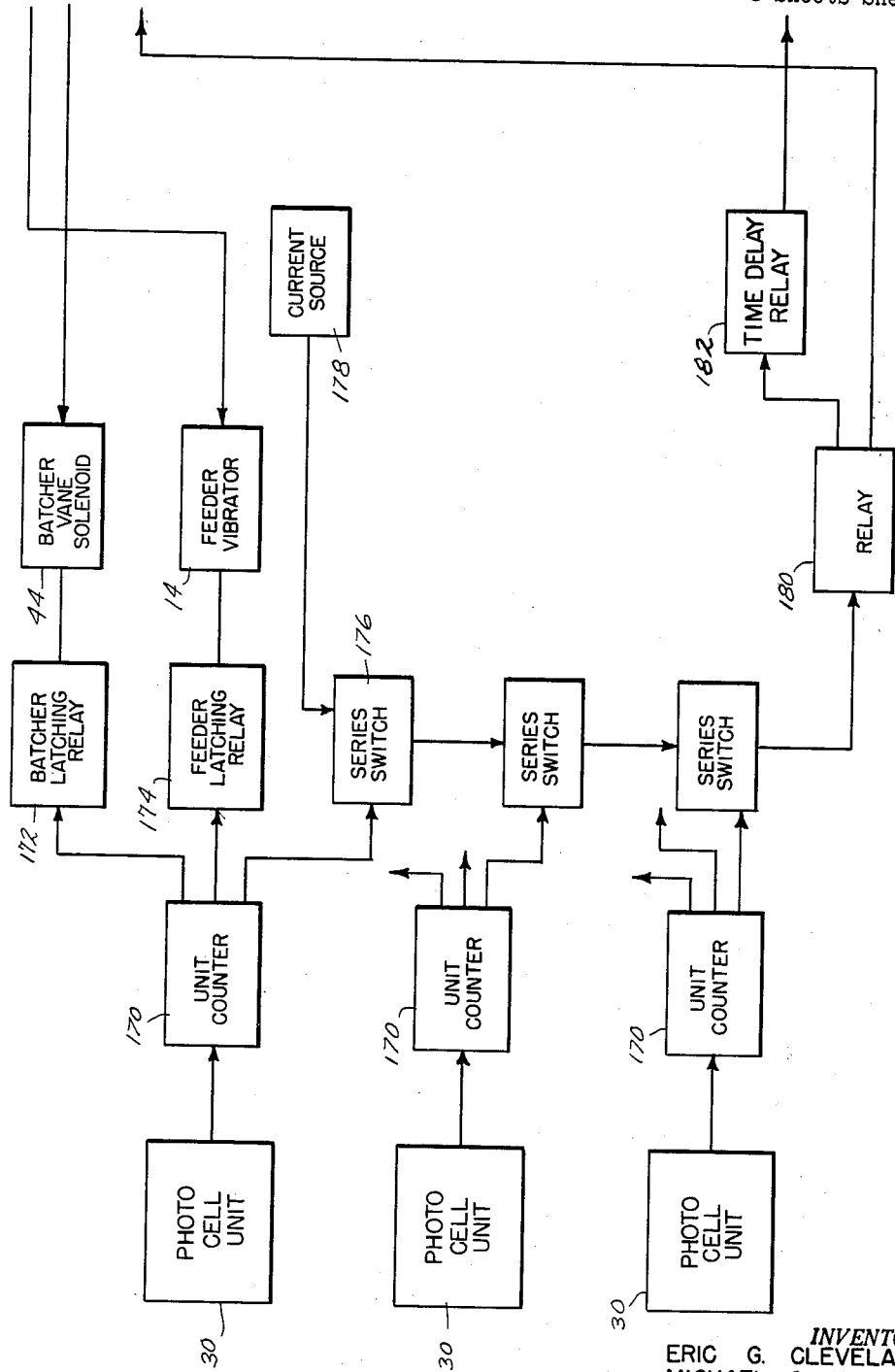

FIGS. 9 and 9A together illustrate schematically the control system embodied in the present invention; and FIGS. 10–13 are diagrammatic plan views illustrating the operating cycle of the machine.

The present invention is an outgrowth of the invention illustrated and described in Patent No. 2,899,784, issued August 18, 1959, to Eric G. Cleveland, one of the present applicants, and Archibald D. Standley, Jr., for "Method and Apparatus for Counting and Packaging Articles." Certain principles involved in the apparatus of said patent are embodied in the apparatus illustrated and described in the accompanying drawings.

Referring first to FIGS. 1, 2, and 3, the invention comprises an article feeding mechanism which embodies an endless belt 2 which is traveling at relatively high speeds in the direction indicated by the arrow in FIG. 1. Positioned above the upper run of endless belt 2 is a plurality of pairs of opposed parallel guide members 4 and 6. These guide members serve to channel articles which are fed from a feeding unit located upstream of the conveyor belt 2 and which are deposited onto the belt by gravity. The articles are directed onto the belt by means of chutes 8, there being one chute for each pair of guide members 4 and 6. These chutes 8 are located in front of feed troughs 10 which receive articles deposited from a supply hopper 12 and direct them toward the chutes 8. The chutes or troughs 10 are mounted on vibrators 14 which are electrically operated. When these vibrators are in operation, the troughs 10 are agitated sufficiently to cause the articles supported thereby to travel toward the chutes 8. Each trough 10 has its own vibrator 14.

The guides 4 and 6 are of the kind which are illustrated and described in the copending patent application of Michael C. Klapes, Serial No. 787,025, filed January 15, 1959, for "Apparatus for Channeling Articles." All of the guides 4 move as a unit with respect to the corresponding guides 6, separation of the guides being controlled by a knob 20 which includes a vernier device (not shown) for indicating exactly the spacing between each pair of guides 4 and 6. This apparatus is not claimed to be new by applicants, it being claimed in the foregoing copending application of Michael C. Klapes.

The articles on belt 2 which are channeled between the guides 4 and 6 are discharged into a series of compartments 22 each of which is open at its top and bottom ends and includes a batcher vane 24 and a line selector vane 26. Associated with each compartment and mounted adjacent to the delivery ends of guides 4 and 6 is a plurality of photoelectric detecting units 30. Each of these photoelectric detecting units 30 comprises a photoelectric cell 32 and a light source 34. Light from light source 34 is directed toward the photocell 32. The beam of light for each unit extends across the freeflight path of articles discharged from conveyor belt 2 toward the particular receptacle associated with the photoelectric detecting unit. Each time an article interrupts the beam of light, an output pulse is derived from the photocell 32. Each photocell 32 is connected to a counter unit. Details of the counter unit are omitted since such units are well-known to persons skilled in the art and also since the counter unit is not claimed to be novel. Accordingly, the counter unit is illustrated only schematically in the electrical system shown in FIG. 9. This system is more fully described hereinafter.

Each of the vanes 24 is connected to a shaft 40 which is coupled to and rotated by a rotary solenoid 44. The vanes 24 occupy one of two alternate positions. In one position, illustrated in dotted lines in FIG. 2, articles are free to fall through the receptacle. In the opposite position, shown in full lines in FIG. 2, each vane 24 engages an inclined shoulder 50 which is formed integral with one side wall of its receptacle 22. In this latter position, each vane 24 prevents articles from dropping down through the receptacle, the articles accumulating on the vane 24 and the shoulder 50. The normal position of vanes 24 is the dotted line position illustrated in FIG. 2.

The bottom vane 26 in each receptacle is supported by a pair of coupling members 56 secured in the side walls of the receptacle. Each coupling 56, except the first or leftmost one 56a (FIG. 4) for the first receptacle (counting from left to right in FIGS. 2 and 6) is mounted in the adjacent walls of adjacent receptacles. Each coupling has a key 58 at each end. These keys fit in matching keyholes formed in vanes 26. The key on the left or upstream end of the first coupling 56a is attached to an arm 60 which is provided with an elongated slot 62 to receive a pin 64 which is attached to a bifurcated arm 66. Arm 66 is attached to an elongated piston rod 68 which is part of a fluid-pressure actuator CFR6. Fluid-pressure actuator CFR6 functions to shift all of the vanes 26 between two extreme positions. In one position, illustrated in dotted lines FIG. 3, the vanes 26 are inclined toward the front wall of the receptacles. In the other extreme position, the vanes are slanted toward the rear wall of the receptacles. It is to be noted that each of the receptacles is provided at its bottom end with two discharge ports 74 and 76. Screwed onto the ends of these discharge ports 74 and 76 are adaptors 78. The function of adaptors 78 is comparable to the function of a funnel. They act to direct articles falling out of the receptacles into a narrow stream for deposition in bottles B located beneath the outlet ports. When the vanes 26 are in the dotted line position illustrated in FIG. 3, the articles are discharged through the outlets 74, into bottles B1 located on a rear conveyor C1. When the vanes 26 are in the opposite extreme positions, the articles are discharged through outlets 76 into bottles B2 located on a front conveyor C2.

The solenoids 44 are operated in response to signals produced by individual counter units which receive impulses from the photoelectric detecting units 30. These solenoids act to shift the vanes 24 to the position illustrated in full lines in FIG. 2 when a predetermined number of articles have fallen through the receptacles. Thus, for example, if fifty articles are to be supplied to each container B1 or B2, each batcher vane 24 will be shifted to the blocking position illustrated in FIG. 2 by its solenoid 44 as soon as the fiftieth pulse from the associated photoelectric detecting unit has been processed to actuate the solenoid in question. The line selector vanes 26 necessarily function as a unit. They shift from one line to the other only after each of the receptacles has discharged a predetermined number of articles.

Turning now in particular to FIGS. 2, 3, and 6, the two conveyors C1 and C2 are of standard articulated construction, being made up of links 90 which are connected by pins 92. Conveyors C1 and C2 operate at a constant speed and unidirectionally, with the direction of movement being from left to right in FIGS. 2 and 6. These conveyors are mounted on conventional sprockets (not shown) which are driven by conventional means from a standard electrical motor (also not shown). Conveyors C1 and C2 are spaced from each other by an amount sufficient so that the bottles B1 and B2 which are carried thereon are directly in line with the two discharge orifices 74 and 76.

Bottles are fed onto the two conveyors C1 and C2 in a steady stream from a supply section (not shown). The bottles ordinarily would travel along on the conveyor without interruption. However, means are provided for segregating the bottles in the two lines into groups of predetermined number.

Both conveyors are provided with identical means for segregating the bottles into groups. Accordingly, only the stop means associated with the forward conveyor C2 are shown in FIG. 6. However, the stop means associated with the rear conveyor are illustrated diagrammatically in FIGS. 10–13.

Turning now to FIG. 6, there are provided three substantially identical bottle-stopping units CF1, CF2, and CF3. Stop CF1 is located upstream of stop CF2 by an amount equal to the length of the space occupied by a series of containers equal in number to the number of receptacles 22. Stop CF2 is always located upstream of the receptacle assembly. Stop CF3 is located downstream of stop CF2 by a distance at least equal to the distance between stops CF1 and CF2. Preferably the positions of all three stops are adjustable so as to allow for bottles of different sizes. The stops for the rear conveyors are CR1, CR2 and CR3.

The stop elements are single acting pneumatic actuators which include fingers 100 which are normally retracted within the units but which are moved to an extended position (see CF2 in FIG. 6) when air is supplied to the cylinders of the units through suitable inlets. Although not shown, it is to be understood that these units include spring elements which normally urge the fingers into the units when no air is applied to the cylinders. When the fingers are retracted into the units, they are out of the way of bottles on the conveyors. When they are extended they obstruct movement of bottles by the conveyors. As explained in more detail hereinafter, the two rear stops CR1 and CR2 (and similarly the front stops CF1 and CF2), are operated alternately.

Positioned adjacent the two conveyors C1 and C2 are extensible bottle positioner assemblies 110 and 112. These bottle positioner assemblies are identical in construction. FIGS. 2, 3, and 6 illustrate the location and construction of these bottle positioners. In view of the fact that these positioners are identical, identical numerals are used to designate identical parts. In addition, for convenience of illustration, certain portions of the rear bottle positioner assembly 110 are omitted.

These bottle positioner assemblies comprise an elongated member 114 having an upstanding flange 116 at one edge and a depending flange 118 at the opposite edge. Extending through suitable holes formed in depending flange 118 adjacent its opposite ends are two shafts 120 and 122. Shafts 120 and 122 are mounted for axial movement in suitable bearing blocks 124 and 126. Also helping to support the member 114 on shafts 120 and 122 are two L-shaped bracket members 128 and 130. The bracket members 128 and 130 are mounted on shafts 120 and 122 respectively, as indicated in FIG. 3 with respect to bracket 128. The rear ends of shafts 120 and 122 are connected to lever arms 134 and 136. These lever arms are attached at their top ends to an elongated rod 138. This rod is journaled in suitable upstanding bearing blocks 140 and 142. The bearing blocks 124, 126, 140, and 142, are all mounted on a suitable horizontal supporting surface 144. Also mounted on the surface 144 is a pressure actuator. The one associated with the rear conveyor C1 is identified as CR4. The one associated with the front conveyor is identified as CF4. The piston rods of the pressure actuators CF4 and CR4 are secured to angular bracket members 148. These bracket members in turn are secured to the upstanding flanges 116 of horizontal members 114. These pressure actuators are double-acting types. When fluid pressure is admitted through one port, the pressure actuator's piston rod will move in one direction; and when fluid pressure is introduced through another port, the piston rod will move in the opposite direction. In this case, when the piston rod moves outward, the horizontal member 114 will move away from the associated conveyor C1 or C2. For reasons hereinafter set forth, the horizontal member 114 is properly identified as a carriage since it can move laterally.

Each carriage 114 carries a fluid pressure actuator of the double-acting type. The fluid pressure actuator on the rear carriage is identified as CR5, and the one on the front carriage is identified as CF5. These pressure actuators have elongated piston rods 154. Mounted on each piston rod 154 is a plurality of blocks 156. The block 156 nearest the cylinder of the pressure actuators CF5 and CR5 is locked to the cylinder so as to be incapable of relative movement. This block is identified as 156a in FIG. 6. The opposite end block, identified as 156b, is releasably locked to the piston rod 154. The intermediate blocks 156 are loosely mounted on the piston rod so as to be capable of slidable motion relative to the piston rod. Each of these blocks is provided with an up-standing pivot pin 158 which serves to anchor a pair of links 160 and 162. The entire group of links 160 and 162 are connected so as to form a lazy tongs assembly. When the piston rod is extended, the lazy tongs assembly will extend with the rod. Similarly, when the piston rod is retracted into the cylinder, the lazy tongs assembly will contract. In addition to forming a pivotal attachment for a pair of links of the lazy tongs assembly, each block 156 also supports a laterally extending bottle spacing pin 164. All of the pins 164 are identical. Since the blocks 156 will always be regularly spaced with respect to each other, the fingers 164 will also be regularly spaced with respect to each other. Similarly, since the spacing of the blocks 156 will vary according to the amount by which the piston rod protrudes from the cylinder, the spacing of the fingers will also vary according to the length of the projecting part of the piston rod. The fingers will have minimum spacing when the piston rod is retracted and will have maximum spacing when the piston rod is extended. The piston rod 154 is provided with an adjustable block 166 which functions as a stop for the piston rod. In this connection, it is to be noted that the carriage 114 carries a block 168 through which the piston rod 154 slidably extends. The stop block 166 engages the block 168 when the piston rod is retracted. The position of the block 166 on the piston rod determines the extent to which the piston rod can be retracted. Of course, the location of block 168 is such that it will not prevent the piston rod from being extended a distance sufficient to allow the fingers 164 to be located on the downstream side of compartments 22, as seen in FIG. 2 and also FIG. 6.

Turning now to FIGS. 9 and 9A, there is illustrated an electrical control system for the foregoing apparatus so that it will operate in the manner hereinafter described. In FIG. 9, only three photocell units 30 are illustrated. However, it is to be understood that the number of photocell units will correspond with the number of compartments 22 which are embodied in the machine. In this case, FIG. 2 indicates six photocell units. Therefore, to be complete, FIG. 9 would have to indicate six photocell units. However, since the missing photocell units would function in the same manner as the three which are illustrated, it is not required that all of the photocell units be illustrated. The outputs from the individual photocell units 30 are applied to individual unit counters 170. The outputs from each unit counter 170 are applied along three different paths. One output from each unit counter 170 is fed to a batcher latching relay 172 which in turn operates a batcher vane solenoid 44. Another output from each unit counter is fed to a feeder latching relay 174 which in turn operates a feeder vibrator 14. A third output from each unit counter 170 is used to close a normally open series switch 176. In FIG. 9, the batcher latching relays, batcher vane solenoids, feeder latching relays, and feeder vibrators, are not all shown. Instead, solely the components for the first unit counter are shown. However, it is to be understood that similar components are employed with respect to the other unit counters.

Assuming that each unit counter is set to a total of fifty articles, each unit counter will produce an output signal when it has counted fifty articles. As soon as this occurs, the batcher latching relay associated with a particular counter will close, thereby operating the batcher vane solenoid to flip vane 24 to the position illustrated in solid lines in FIG. 2. When this occurs, no more articles will fall through the receptacle 22 into a bottle beneath the receptacle. Instead, additional articles will simply accumulate between shoulder 50 and vane 24. Similarly, the output from the unit counter will activate the feeder latching relay 174 so as to stop the feeder vibrator 14 associated with a particular unit counter. In this way, no additional articles will be fed onto the conveyor belt. As a result, the number of articles which will accumulate on the shoulder 50 of the receptacle in question will be limited to those which have already been deposited on the conveyor belt. The switches 176 are connected in series between a current source 178 and a control relay 180. Relay 180 is actuated by the current source when all of the switches 176 are closed. When relay 180 is actuated, it produces an output which is used to actuate a time delay relay 182 and also a timer relay T1. The time delay relay is of the type which operates at a predetermined time interval after the input signal is applied. In this case, time delay relay 182 is used to actuate a latching relay 184. The latter is of the type which is converted to alternate conditions by successive input pulses.

The output of timer relay T1 is used to operate a feeder reset circuit 188 and a control relay 190. The former reactivates all of the feeder vibrators 14. The latter actuates a re-set circuit 192 that de-energizes all of the batcher solenoids 44, a reset circuit 194 that resets all of the series switches, a latching relay 196, and a second timer relay T2. The signal passed by latching relay 196 is coupled by means of a control relay 198 to one of two pairs of contacts 200 and 202 of latching relay 184. Latching relay 196 has normally opened contacts. Relay 198 has normally closed contacts. Contacts 200 are open when contacts 202 are closed, and vice versa. Timer relay T2 produces two outputs. One of these outputs is applied to one of two pairs of contacts 204 and 206 of latching relay 184. Contacts 204 are open when contacts 206 are closed and vice versa. The second output is applied to a timer relay T3. The latter has two outputs. One is applied alternately to contacts 208 and contacts 210 of latching relay 184, the former being open when the latter are closed, and vice versa; the other output of timer relay T3 is used to actuate relay 198, whereby to open its contacts. When this occurs, the latching relay 196 is unlocked—thereby restoring it to its original condition. In addition to the contacts already mentioned, relay 184 also includes an additional pair of normally open contacts 212.

Figure 10:
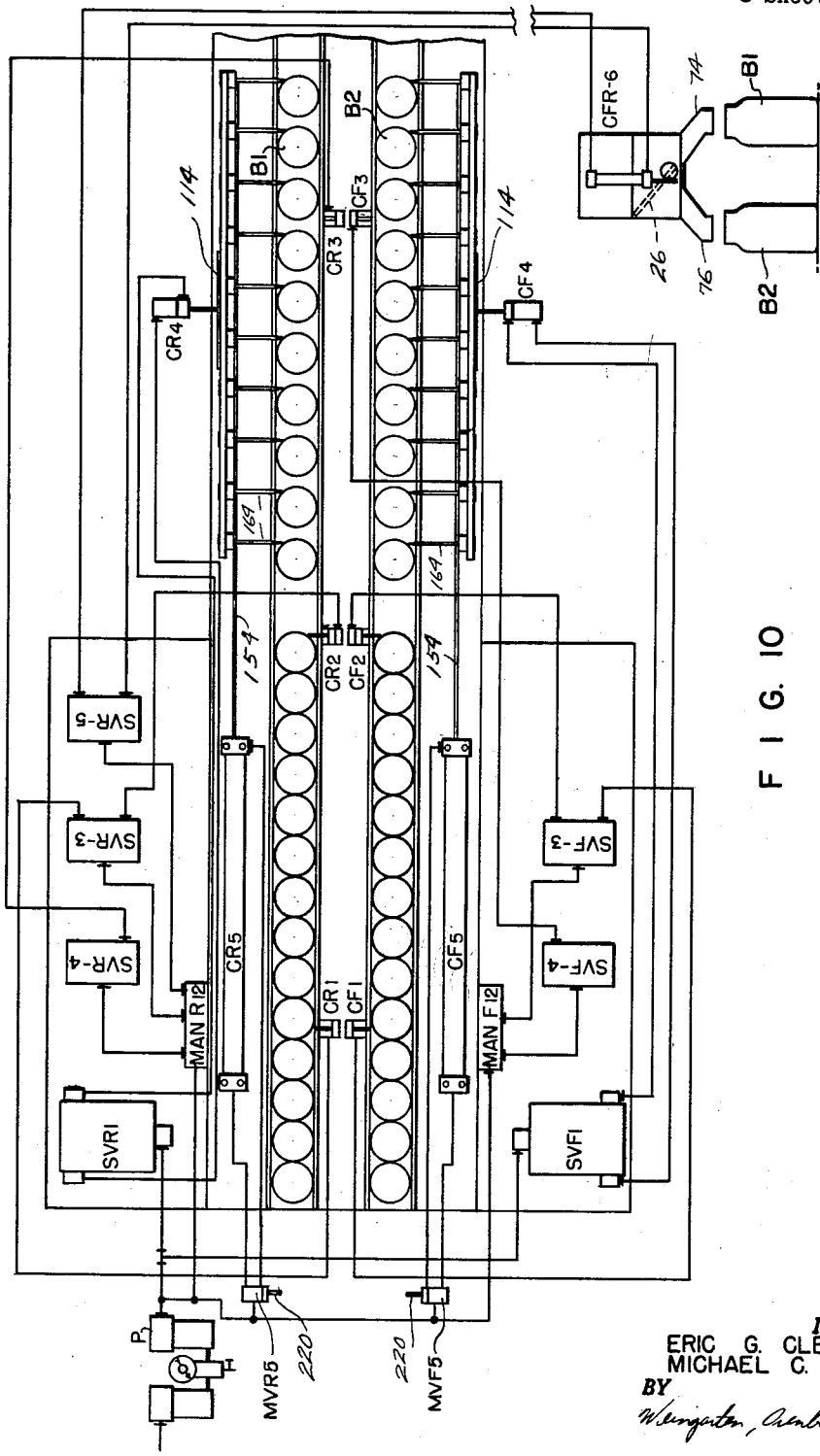
Figure 11:
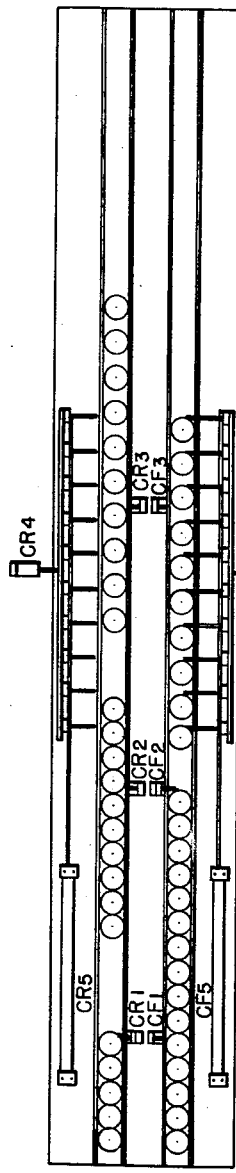

Contacts 200 are used to couple a signal to the solenoid of a solenoid air valve SVF–1. Referring now to FIG. 10, valve SVF–1 controls the application of air from a high pressure source P to the front fluid pressure actuator CF4 which controls movement of the front carriage. Contacts 202 couple signals to the solenoid of an air valve SVR–1 which controls operation of the rear fluid pressure actuator CF4 that controls movement of the rear carriage.

Contacts 204 control a solenoid air valve SVF–3, and contacts 206 control a solenoid air valve SVR–3. The former operates the upstream stops CF1 and CF2 alternately, with one closing as the other opens. The latter operates alternately the corresponding rear upstream stops CH1 and CR2. Contacts 208 and 210 alternately control solenoid air valves SVF–4 and SVR–4. These valves control the downstream stops CF3 and CR3 respectively. Contacts 212 couple an A.C. power source to a solenoid valve SVFR–5 which in turn controls the line selector fluid pressure actuator CFR–6. All of the air valves are of the type which will be in one position when the solenoid is actuated and which will automatically return to a normal at-rest position when the solenoid is deenergized. As illustrated in FIG. 10, valves SVF–1 and SVR–1 have two outlets; they produce one output when energized and another when deenergized. The same is true for valves SVF–3, SVR–3, and SVR–5. Valves SVF–4 and SVR–4 produce fluid pressure outputs only in one position. Air is supplied to valves SVF–3 and SVF–4 through a common manifold F12. A like manifold R12 distributes air from high pressure source P to valves SVR–3, SVR–4 and SVR–5.

The pressure actuators CF5 and CR5 are controlled by mechanically operated air valves MVF–5 and MVR–5 respectively. These valves MVF–5 and MVR–5 have operating plungers 220, each of which is normally in extended position under the influence of a spring (not shown) contained within the valve housing. When the valves are in this normal position, they supply air to the actuators CF5 and CR5 in a direction so as to extend the piston rods 154. When the plungers are depressed, the valves direct air to the same actuators in a direction to retract piston rods 154. As seen in FIG. 6, valve MVF–5 is positioned on supporting surface 144 so that its plunger 220 will be engaged and depressed by the front carriage 114 when the latter is in withdrawn position, i.e., when the piston rod of actuator CF4 is extended. When front carriage 114 is shifted by actuator CF4 toward its associated conveyor C2, plunger 220 will be released. As a result valve MVF5 will be actuated so as to cause actuator CF5 to extend its piston rod 154, whereby to separate fingers 164. Valve MVR5 is similarly located with respect to the rear carriage 114. Thus operation of both actuators CF5 and CR5 is determined by operation of actuators CF4 and CR4 respectively.

In the illustrated embodiment, variable timer T1 is set to produce an output one second after its input is received and variable timer T3 is set to produce an output one-half second after its input is received. The settings of timers T1 and T3 are not required to be changed for different bottle sizes. The setting of timer T2 varies according to bottle size and conveyor speed. In the usual case timer T2 has a setting of about two seconds.

FIGS. 10–13 illustrate the sequence of operations. In these figures each bottle positioner has ten fingers 164. Accordingly the associated receptacles will total ten instead of six as shown in FIG. 6.

Starting with FIG. 10, it will be observed that both bottle positioners are disposed with their fingers 164 in bottle intercepting position. At the same time both positioners are extended, their fingers being spaced apart so as to locate the bottles beneath the discharge ports 74 and 76 of the receptacles. Also in FIG. 10, the line selector vane 26 is set to divert articles to bottles B1. At the same time only stops CF2 and CR 2 are in bottle-stopping position.

Assume that fifty articles are to be deposited in each bottle B1, and that conveyor 2 and feeder vibrators 14 are all operating. As the fiftieth article is deposited in a particular bottle, the upper vane 24 associated with the receptacle above the filled bottle will close. At the same time the corresponding feeder vibrator will stop and a series switch 176 will close. When the last series switch closes, relay 180 is actuated, causing time delay relay 182 to operate latching relay 184 after a delay of ½ second. When relay 184 is actuated, the line selector vane 26 will be flipped to its other position wherein it will function to divert articles to bottles B2. Timer T1 is operated instantaneously by relay 180. The feeder vibrators 14 start operating again when T1 is actuated. One second after it is started, timer T1 will cause the top vanes 24 to be flipped back to their original positions so as to start a flow of articles to bottles B2.

The output of timer T1 actuates relay 196 and, when this occurs, current will pass through contacts 200 (now closed) to operate valve SVR1. Operation of this valve will cause actuator CR4 to shift the rear carriage 114 away from the bottles B1. The latter are then free to move downstream with the conveyor. As the rear carriage moves back away from the bottles, valve MVR5 will cause actuator CR5 to bring the fingers 164 close together.

Figure 13:
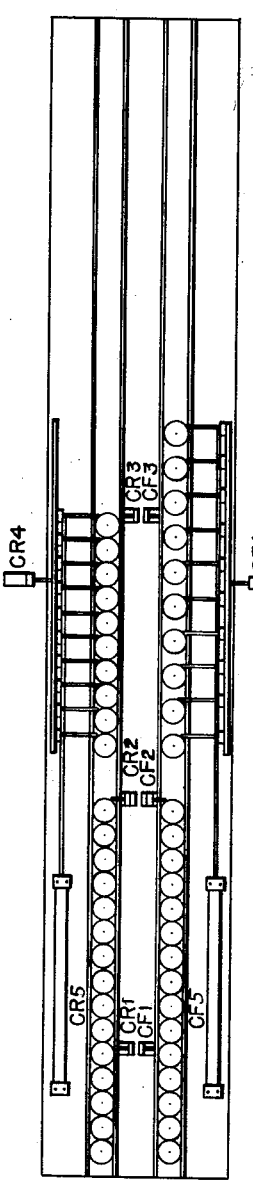

Thereafter (FIG. 11) stops CR1 and CR2 will reverse positions, stop CR1 shifting to its extended bottle-intercepting position and stop CR2 shifting to its retracted position. They will remain in these positions for two seconds as determined by T2, and then they will reverse again (FIG. 13). In the selected embodiment this is ample time to advance a new set of bottles from stop CR2 to stop CR3.

Figure 12:
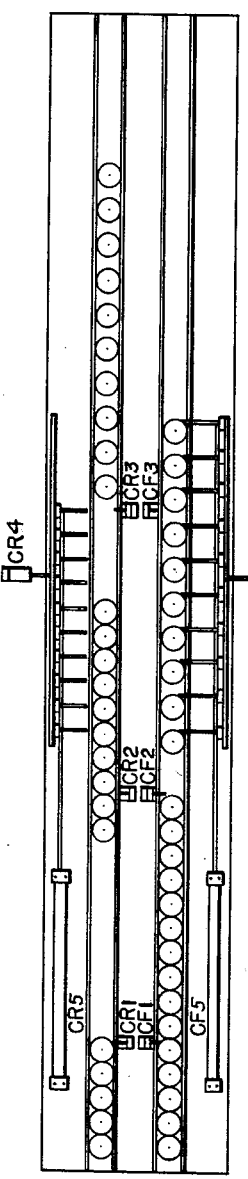

In the intervening time stop CR3 will be operated so as to be in position to intercept a new set of bottles (FIG. 12). Stop CR3 will remain out for one-half second, and during this time normally closed relay 198 will open, causing valve SVR1 to reverse itself so as to cause actuator CR4 to shift the rear carriage 114 toward the new set of bottles. The fingers 164 will be in position between the bottles (FIG. 13) when stop CR3 is released. Of course, movement of carriage 114 toward the new set of bottles results in release of plunger 220 of valve MVR5. Accordingly the actuator CR5 will immediately move the fingers apart so as to allow the new bottles to assume the desired spacing, each bottle ending up directly beneath an orifice 74. The new set of bottles then will be ready for filling and the various elements will be in the same positions as they were at the start of the operating cycle (FIG. 10). The cycle is repeated when bottles B2 on conveyor C2 have been filled.

It is to be noted that stop CR1, CF1, CR2 and CF2 can be shifted parallel to the conveyors so as to obtain proper spacing for different bottle sizes. Similarly the spacing between the fingers can be changed by shifting the block 156b along piston rod 154. It is to be noted also that stops CR3 and CF3 may be incorporated in the bottle positioners, as shown in FIGS. 7 and 8.

In FIGS. 7 and 8 the bottle positioner is identical to the front positioner shown in FIG. 6, except that (1) it is adapted to position ten bottles instead of six and (2) the last or downstream-most pin has been replaced with solid block 226 on the end of which is secured a hollow tube 228 having an extendable pin 230 which is normally held in retracted position by a suitable spring (not shown) contained within tube 228. Air is supplied from valve SVF4 (or valve SVR4 for the rear bottle positioner) through a flexible hose 232 and a section of metal tubing 234. The latter is connected to and supported from the piston rod 154 by a suitable bracket 236. When air is introduced to tube 228, pin 230 will be forced out into bottle-intercepting position, as indicated in dotted lines in FIG. 7. Hence pin 230 functions both as the downstream stop CF3 (or CR3) and also as one of the bottle positioning pins 164.

Three other features are to be noted. These features make it possible to adjust for different bottle sizes without changing, removing, or adding parts.

First of all, conveyor belt 2, all of the guide members 4 and 6, chutes 8, feed troughs 10, hoppers 12, vibrators 14, compartments 22, and photocell units 30 are mounted as a single assembly on a common chassis 250 which can be cranked up or down relative to a supporting cabinet-like structure 252 which incidentally may provide storage space for electrical and electronic units such as counters 170 and relays 180, 182, etc. Up and down movement is accomplished by means of a plurality of telescoping jacks, one of which is shown at 256 (FIG. 1).

Secondly, a pair of adjustable longitudinally-extending bottle guides are associated with each of the conveyors C1 and C2. The guides for conveyor C1 are identified at 260 and 262 in FIGS. 3 and 6. The guides for conveyor C2 are identified at 264 and 266. The inner guides 260 and 264 are moveable toward and away from each other but are lockable in a selected position by means of a plurality of set screws (not shown) which screw into a stationary bar (also not shown) which extends along underneath the inner guides. The outer guide 262 is supported for movement toward and away from inner guide 260. Means not shown are used to lock guide 262 in a set position. The other outer guide 266 is similarly mounted for movement toward and away from inner guide 264. Incidentally, it is to be noted that the bottle stops CF1, CF2, CF3, CR1, CR2, and CR3 are mounted on the outer guides 262 and 266.

Thirdly, the horizontal supporting surfaces 144 are attached to the outer guides 262 and 266. This is best seen in FIG. 3 which shows a portion of the rear supporting surface 144 attached to guide 262. In practice the rear and front supporting surfaces 144 are attached to guides 262 and 266 by a screw and slot arrangement whereby surfaces 144 can be moved longitudinally upstream or downstream parallel to the conveyors.

It is believed to be apparent that the foregoing three features make it possible to adjust for bottles of various heights and diameters. Making the compartments 22 moveable up and down allows for differences in bottle height; making guides 260, 262, 264 and 266 moveable laterally permits bottles of different diameters to be centered on the conveyor; and making horizontal surfaces 144 moveable longitudinally relative to the outer guides 262 and 266 permits shifting of the bottle positioners so that their first fingers 164, i.e., the fingers carried by the two stationary blocks 156a (FIG. 6), will locate their bottles directly beneath the two outlets 74 and 76 of the first compartment 22. The remaining fingers will automatically locate their bottles beneath their corresponding compartments 22.

Of course, still other modifications and changes may be made without departing from the principles or spirit of the present invention and without sacrificing any of the attendant advantages such as speed, versatility, reliability or economy. Accordingly, it is to be understood that this invention embraces all of the variations, modifications and substitutions which naturally occur to persons skilled in the art and that it is not to be limited or restricted except as provided by the following claims.

We claim:
1. Apparatus for conveying containers and for automatically positioning a predetermined number of said containers at a predetermined number of spaced filling stations, said apparatus comprising a unidirectionally moving conveyor on which a series of containers may be positioned, a first container stop located at a predetermined point adjacent to the line of travel of said conveyor, said first container stop movable from a first inactive position to a second container stopping position, a second container stop located at a second point adjacent the line of travel of said conveyor, said second point located downstream of said first point by a distance equal to the distance occupied by a selected number of containers disposed in series and contacting relation with each other, said second container stop being movable between a first inactive position and a second container intercepting position, a third container stop located at a third point adjacent to the line of travel of said conveyor, said third point located downstream of said second point by a distance greater than the distance between said second and first points, said third stop being movable from a first inactive position to a second container intercepting position, a fluid pressure actuator having a piston rod disposed parallel to said conveyor, a lazy tongs assembly having one end stationary and another end attached to said piston rod for movement therewith, whereby said lazy tongs assembly will open when said piston rod is moved in one direction and will close when said piston rod is moved in the opposite direction, a series of fingers attached to said lazy tongs assembly, said fingers disposed in uniform spaced relation to each other with the spacing between said fingers becoming larger as said assembly is extended and smaller as said assembly is contracted, said piston rod movable from a first position wherein the finger on the downsteam end of said assembly is located at said third point and a second position wherein said finger is downstream of said third point and the spacing between said fingers is greater than the distance between alternate containers on said conveyor, means supporting said lazy tongs assembly for movement toward and away from said conveyor between a first position wherein said fingers are out of intercepting relation with successive containers held up by said third stop and a second position wherein said fingers are in intercepting relation with said successive containers, means for moving said second stop to its first intercepting position and said first stop to its second intercepting position, means for moving said third stop to its second intercepting position in time to intercept the first container released when said second stop is moved to its first position, means for moving said lazy tongs assembly to its second position, and means for operating said pressure actuator to extend said piston rod after said lazy tongs assembly has moved to its second position.

2. A mechanism for positioning bottles comprising a conveyor for carrying containers in single file and in contacting relation with each other, a lazy tongs assembly located to one side of said conveyor, said assembly having a plurality of fingers disposed at right angles to the path of movement of said conveyor, a movable carriage supporting said lazy tongs assembly, means securing one end of said lazy tongs assembly to said carriage, a fluid pressure actuator mounted on said carriage, said fluid pressure actuator having a piston rod, the other end of said lazy tongs assembly secured to said piston rod whereby said lazy tongs assembly is extended or contracted by said piston rod on operation of said fluid pressure actuator, a stop element for intercepting bottles at a point in line with said other end of said lazy tongs assembly when said assembly is in contracted condition, means for moving said carriage toward said conveyor to place said fingers between containers on said conveyor held stationary by said stop element, and means for operating said fluid pressure actuator in a direction to extend said lazy tongs assembly while said carriage is positioned close to said conveyor with said fingers between said containers, whereby said containers are moved downstream by said conveyor but are stopped at certain predetermined spaced positions by said fingers.

3. Apparatus for conveying containers and positioning them in spaced relation at a series of spaced filling stations comprising, a constantly moving conveyor, a first container stop located at a first point adjacent to but out of the line of travel of said first conveyor, first means for moving said first stop into container stopping position, a second container stop located at a second point adjacent to but out of the line of travel of said conveyor, said second point located downstream of said first point by an amount equal to the length of a line of predetermined number of containers arranged in a series, second means for moving said second stop into container stopping position, a third stop located at a third point downstream of said second stop by an amount greater than the distance between said first and second stops, said third stop also located adjacent to but out of the line of travel of said conveyor, third means for moving said third stop into container stopping position, a series of laterally-extending evenly-spaced fingers, means supporting said fingers to one side of said conveyor between said second and third points with the downstream-most finger located at said third point, a series of evenly-spaced container-filling stations located downstream and upstream of said third point, means operative when actuated to separate adjacent fingers by an amount equal to the spacing between said stations to position each finger slightly downstream of a different station, means for operating said first and second means alternately, means for operating said third means immediately after said first means is operated, means for moving said fingers into the line of travel of said conveyor whereby to insert said fingers between sucessive containers blocked against movement by said third stop, and means for actuating said finger-separating means to locate said containers at said stations, said last-mentioned means operating only after said fingers have been inserted between containers located upstream of said third stop.

4. In combination with a machine having a predetermined number of filling stations for simultaneously filling a plurality of containers, one at each station, apparatus for positioning containers at said filling stations and for moving them away from said filling stations after they have been filled, said apparatus comprising a constantly moving convelor running past said stations, a first traffic gate for stopping movement of containers on said conveyor, a second traffic gate for stopping movement of containers on said conveyors, said second gate located downstream of said stations, a third traffic gate located downsteram of said second gate, each gate movable between a first open position and a second closed position, said first and second gates spaced from each other by an amount sufficient to accommodate only $n$ containers, where $n$ equals the number of filling stations, means for moving said first gate to open position and moving said second gate to closed position, whereby containers on said conveyor will pass by said first gate and accumulate upstream of said second gate, means for closing said first and third gates and opening said second gate after $n$ containers have accumulated between said first and second gates, whereby said $n$ containers will pass by said second gate and accumulate upstream of said third gate, a longitudinally expansible assembly disposed parallel to said conveyor downstream of said second gate, $n$ evenly spaced fingers carried by said assembly, said fingers extending laterally in the direction of said conveyor, said assembly movable laterally between a first position wherein said fingers are disposed to intercept containers on said conveyor and a second position wherein said fingers are disposed in non-intercepting relation with containers on said conveyor, said assembly normally contracted with its downstream-most finger located in line with said third gate, means for moving said assembly laterally from said second position to said first position after $n$ containers have accumulated upstream of said third gate, whereby each of said fingers will intercept a container, means for opening said third gate after said assembly has been shifted to said first position, means operative upon opening of said third gate for uniformly expanding said assembly longitudinally to space said fingers apart by an amount sufficient to locate each of said $n$ containers at a different one of said filling stations, means for moving said assembly back to said second position after said containers have been filled, whereby to permit said $n$ containers to move downstream of said filling stations, and means for contracting said assembly after said assembly has been moved out of intercepting relation with said containers.

5. Apparatus comprising a conveyor, a carriage located to one side of said conveyor and movable laterally toward and away from said conveyor, an elongated longitudinally expandable assembly mounted on said carriage and disposed parallel to said conveyor, a plurality of fingers by said assembly and extending laterally thereof toward said conveyor, means for moving said carriage toward said conveyor to place said fingers in position to intercept containers on said conveyor, means for expanding said assembly longitudinally after said fingers have been placed in container-intercepting position, means operative after said assembly has been expanded for moving said carriage away from said conveyor to remove said fingers from container-intercepting position, and means for thereafter contracting said assembly to its original length.

6. Apparatus as defined by claim 5 wherein said assembly comprises a lazy-tongs linkage.

7. Apparatus for spacing articles comprising a longitudinally expandable lazy-tongs assembly having a series of laterally-projecting evenly-spaced fingers, a carriage on which said assembly is mounted for lateral movement, means for moving said carriage laterally along a path parallel to said fingers, and means for expanding said assembly whereby to increase the spacing between said fingers without disturbing the uniformity of said spacing.

8. Apparatus for spacing articles comprising an elongate longitudinally expandable assembly having a series of evenly spaced fiingers projecting laterally thereof, a carriage on which said assembly is disposed, means anchoring one end of said assembly to said carriage, means supporting the opposite end of said assembly for longitudinal movement relative to said carriage, and means for moving said opposite end of said assembly toward and away from said one end whereby to vary the spacing between said fingers.

9. Apparatus as defined by claim 8 wherein said assembly is a lazy-tongs linkage.

10. Apparatus for spacing articles comprising a fluid pressure actuator having an elongated longitudinally movable piston rod, a lazy-tongs assembly having a series of laterally projecting evenly spaced fingers, and means attaching said assembly to said actuator whereby said assembly will expand longitudinally when said piston rod moves in one direction and will contract longitudinally when said piston rod moves in the opposite direction.

11. Apparatus for spacing articles comprising a supporting member, a carriage, means for movably supporting said carriage on said supporting member, a fluid pressure actuator carried by said carriage, said actauator having an elongated longitudinally movable piston rod, a lazy-tongs assembly having a series of laterally projecting evenly spaced fingers, and means attaching said assembly to said actuator whereby said assembly will expand longitudinally when said piston rod moves in one direction and will contract longitudinally when said piston rod moves in the opposite direction.

12. Apparatus for spacing articles comprising a conveyor for moving articles, a plurality of article-spacing fingers, means supporting said fingers in predetermined spaced parallel relation, said fingers all extending laterally of said conveyor, said finger-supporting means movable laterally from a first position wherein said fingers are out of intercepting relation with articles on said covveyor and a second position wherein said fingers are in intercepting relation with articles on said conveyor, means for moving said finger-supporting means between said first and second positions, and pressure-responsive extensible means for varying the spacing between said fingers uniformly while in said second position.

13. Apparatus as defined by claim 12 wherein said last-mentioned means moves all but one of said fingers.

14. Apparatus comprising a continuous conveyor, a carriage located to one side of said conveyor and movable toward and away from said conveyor, an elongated longitudinally expandable assembly mounted on said carriage, said assembly disposed with its longitudinal axis parallel to the path of movement of said conveyor, a plurality of fingers carried by said assembly, said fingers arranged in series along the length of said assembly and extending laterally thereof toward said conveyor, the spacing between said fingers being a function of the expandability of said assembly, means for moving said carriage toward said conveyor to place said fingers in position to intercept containers on said conveyor, means for expanding said assembly longitudinally after said fingers have been placed in container-intercepting position whereby to increase the spacing between said fingers, means operative after said assembly has been expanded for moving said carriage away from said conveyor to remove said fingers from container-intercepting position, and means for thereafter contracting said assembly to its original length.

15. Apparatus for conveying and positioning containers comprising a continuous conveyor for carrying a series of containers disposed in series with each other, a plurality of fingers normally disposed to one side of said conveyor, means for (1) moving said fingers toward said conveyor a distance sufficient to intercept a plurality of containers on said conveyor while said conveyor is operating and (2) spacing said fingers apart while in container-intercepting position whereby to space said intercepted containers apart uniformly on said conveyor while said conveyor is operating.

16. Apparatus for conveying and positioning containers comprising a continuous conveyor for carrying a series of containers, a lazy-tongs linkage disposed to one side of said conveyor, a plurality of container-spacing members attached to said lazy-tongs linkage, said container-spacing members moving away from each other when said lazy-tongs linkage is expanded and moving toward each other when said lazy-tongs linkage is contracted, means for moving said linkage horizontally toward said conveyor a distance sufficient for said container-spacing members to intercept a plurality of containers on said conveyor, and means for expanding said lazy-tongs linkage when said container-spacing members are in container-intercepting position.

References Cited in the file of this patent

UNITED STATES PATENTS

| | | |
|---|---|---|
| 2,573,100 | Haecks | Nov. 17, 1948 |
| 2,632,553 | Stirn et al. | Mar. 24, 1953 |
| 2,632,588 | Hoar | Mar. 24, 1953 |
| 2,760,315 | Wilckens et al. | Aug. 28, 1956 |
| 2,929,181 | Poupitch | Mar. 22, 1960 |

FOREIGN PATENTS

| | | |
|---|---|---|
| 1,061,677 | Germany | July 16, 1959 |

UNITED STATES PATENT OFFICE
CERTIFICATE OF CORRECTION

Patent No. 3,129,544                                    April 21, 1964

Michael C. Klapes et al.

It is hereby certified that error appears in the above numbered patent requiring correction and that the said Letters Patent should read as corrected below.

Column 11, line 16, for "convelor" read -- conveyor --; line 19, for "conveyors" read -- conveyor --; line 20, before "stations" insert -- first gate and upstream of said --; line 21, for "steram" read -- stream --; same column 11, line 65, before "by" insert -- carried --.

Signed and sealed this 22nd day of September 1964.

(SEAL)
Attest:

ERNEST W. SWIDER                                  EDWARD J. BRENNER
Attesting Officer                                       Commissioner of Patents